US012261372B2

(12) United States Patent
Tseng

(10) Patent No.: US 12,261,372 B2
(45) Date of Patent: Mar. 25, 2025

(54) FINE-TUNING HOLDER FOR LOW-EARTH-ORBIT-SATELLITE ARRAY ANTENNA

(71) Applicant: JONSA TECHNOLOGIES CO., LTD., Nantou (TW)

(72) Inventor: Ying-Chieh Tseng, Nantou (TW)

(73) Assignee: JONSA TECHNOLOGIES CO., LTD., Nantou (TW)

( * ) Notice: Subject to any disclaimer, the term of this patent is extended or adjusted under 35 U.S.C. 154(b) by 0 days.

(21) Appl. No.: 18/237,869

(22) Filed: Aug. 24, 2023

(65) Prior Publication Data

US 2025/0070460 A1 Feb. 27, 2025

(51) Int. Cl.
*H01Q 3/08* (2006.01)

(52) U.S. Cl.
CPC .................................... *H01Q 3/08* (2013.01)

(58) Field of Classification Search
None
See application file for complete search history.

(56) References Cited

U.S. PATENT DOCUMENTS 5,982,333 A * 11/1999 Stillinger ................. H01Q 3/08 342/359
7,142,168 B1 * 11/2006 Sinclair .................. H01Q 19/10 343/890
2009/0231224 A1 * 9/2009 Felstead ................... H01Q 3/08 343/882
2019/0341671 A1 * 11/2019 Conrad ................ H01Q 1/1207

FOREIGN PATENT DOCUMENTS

CN 107910643 A * 4/2018 ............... H01Q 3/02
CN 217114760 U * 8/2022
GB 2452082 A * 2/2009 ............... H01Q 1/12

* cited by examiner

*Primary Examiner* — Dameon E Levi
*Assistant Examiner* — Anh N Ho
(74) *Attorney, Agent, or Firm* — Marshall Lerner; Brad Mattes; Kleinberg & Lerner LLP.

(57) ABSTRACT

A fine-tuning holder for a low-earth-orbit-satellite array antenna has a supporting mount, an adjusting unit, and a tray. The supporting mount has a fixed axis. The adjusting unit is disposed on the supporting mount and is rotated relative to the supporting mount about a first rotating axis being inclined relative to the fixed axis. The tray is disposed on the adjusting unit and is rotated relative to the adjusting unit about a second rotating axis being inclined relative to the first rotating axis. When terrains of a mounting position are rugged, rotate the adjusting unit about the first rotating axis for aligning the tray with the horizon, and rotate the tray about the second rotating axis to adjust the azimuth angle of the tray. The low-earth-orbit-satellite array antenna can be directly aligned and have maximum efficiency when mounted on the tray.

8 Claims, 11 Drawing Sheets

FINE-TUNING HOLDER FOR LOW-EARTH-ORBIT-SATELLITE ARRAY ANTENNA

BACKGROUND OF THE INVENTION

1. Field of the Invention

The present invention relates to a satellite antenna, and particularly to a fine-tuning holder for a low-earth-orbit-satellite array antenna.

2. Description of Related Art

To mount a satellite antenna, the satellite antenna often needs to be mounted toward a specific direction to accurately receive signals from or send signals to a satellite. Thereby, a conventional mounting support of the satellite antenna commonly has a rotating mechanism for adjusting an azimuth angle of the satellite antenna during mounting.

For a low-earth-orbit-satellite array antenna, in addition to aligning the antenna with the right azimuth angle, aligning the antenna with the horizon also plays an important role in signal's receiving and sending since the low-earth-orbit-satellite array antenna has a maximum beam steering angle and has maximum efficiency when being aligned with the horizon. However, when mounting the low-earth-orbit-satellite array antenna by the conventional mounting support, terrains of a mounting position for the conventional mounting support may interfere with the aligning (e.g. the mounting position has a rugged surface) such that the antenna cannot be aligned with the horizon after mounting and cannot have the maximum efficiency.

To overcome the shortcomings of mounting the low-earth-orbit-satellite array antenna by the conventional mounting support, the present invention tends to provide a fine-tuning holder for a low-earth-orbit-satellite array antenna to mitigate or obviate the aforementioned problems.

SUMMARY OF THE INVENTION

The main objective of the present invention is to provide a fine-tuning holder for a low-earth-orbit-satellite array antenna that can be finely adjusted according to terrains of the mounting place to allow the low-earth-orbit-satellite array antenna to be aligned with both the right azimuth angle and the horizon.

The fine-tuning holder has a supporting mount, an adjusting unit, and a tray. The supporting mount has a fixed axis. The adjusting unit is disposed on the supporting mount and is configured to be rotated relative to the supporting mount about a first rotating axis. The tray is disposed on the adjusting unit and is configured to be rotated relative to the adjusting unit about a second rotating axis. The first rotating axis is inclined relative to the fixed axis, and the second rotating axis is inclined relative to the first rotating axis. The adjusting unit has a bottom groove. The supporting mount has a mounting board contained in the bottom groove to allow the adjusting unit to be rotated around the mounting board. The first rotating axis is a central axis of the mounting board, and the second rotating axis is a central axis of the adjusting unit.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
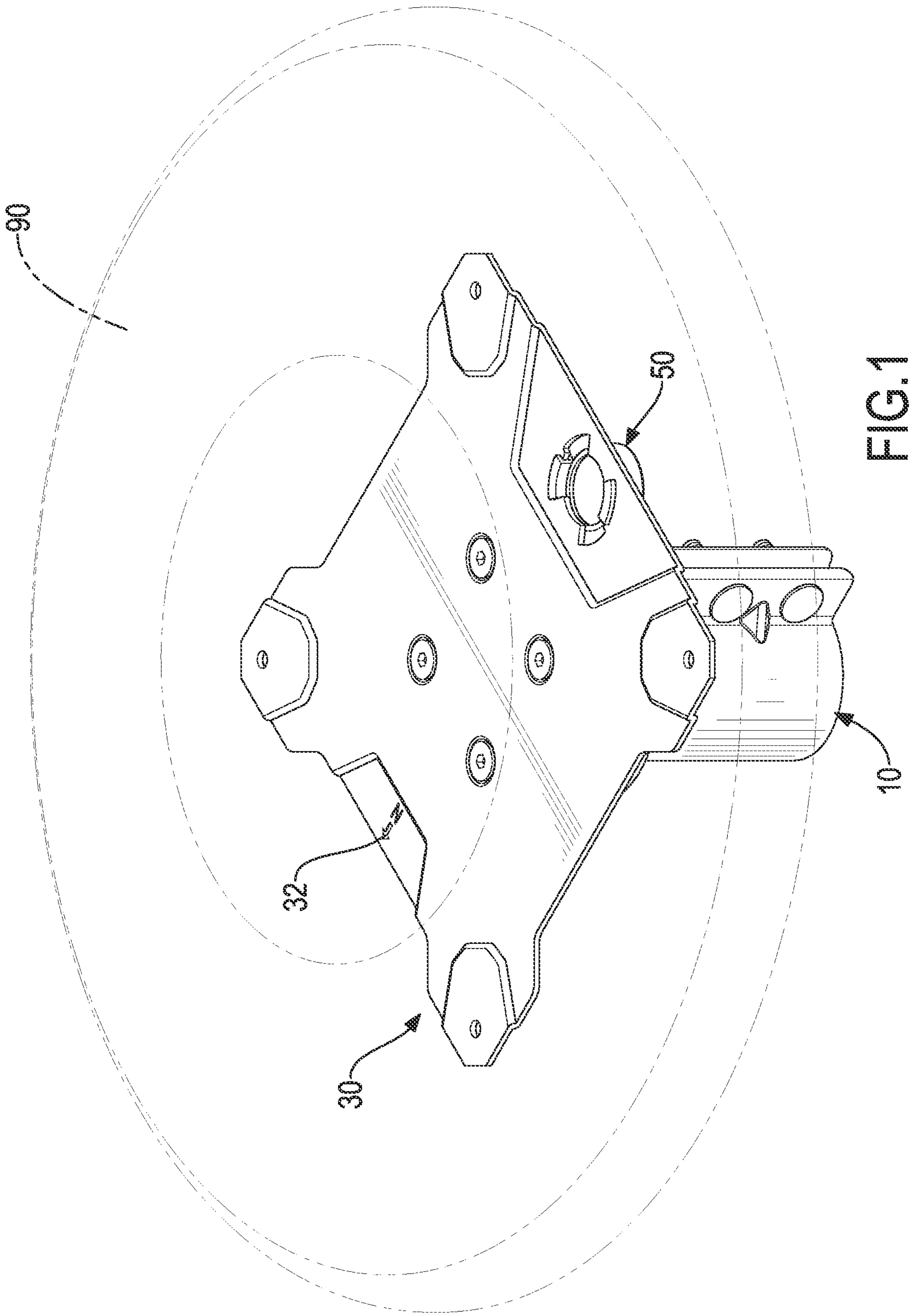
FIG. 1 is a top perspective view of a fine-tuning holder for a low-earth-orbit-satellite array antenna of a preferred embodiment in accordance with the present invention.
Figure 2:
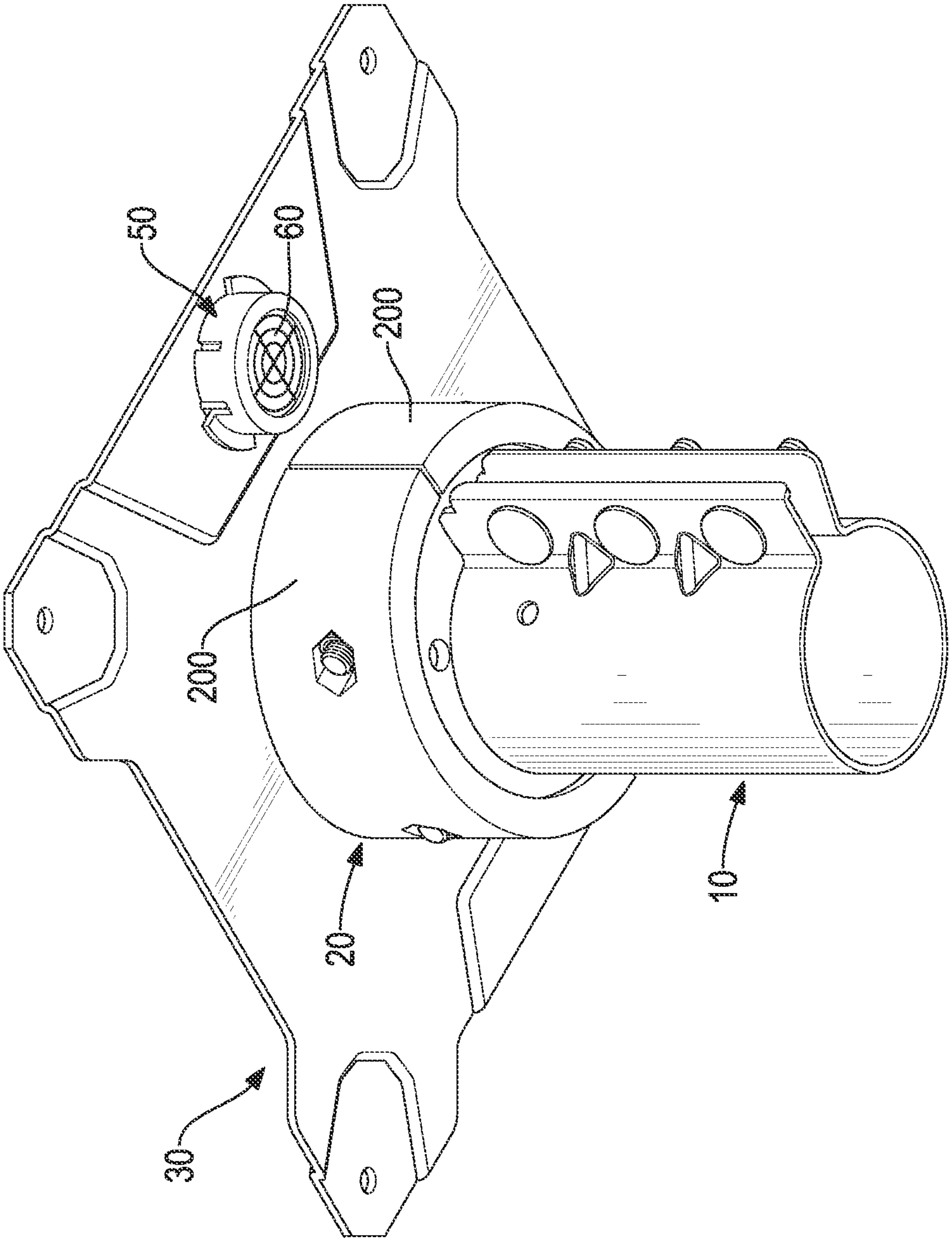
FIG. 2 is a bottom perspective view of the fine-tuning holder in FIG. 1.
Figure 3:
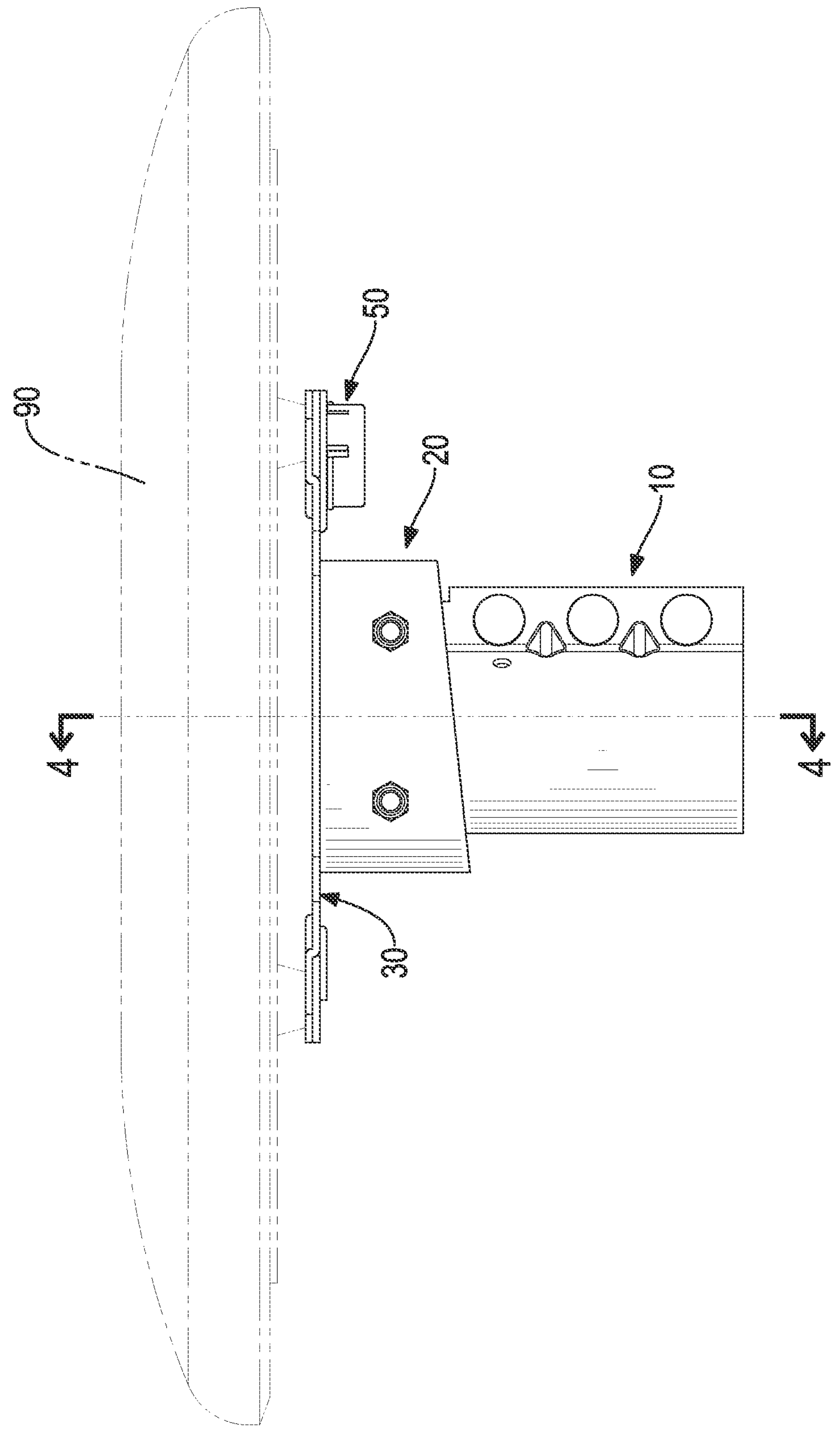
FIG. 3 is a side view of the fine-tuning holder in FIG. 1.
Figure 4:
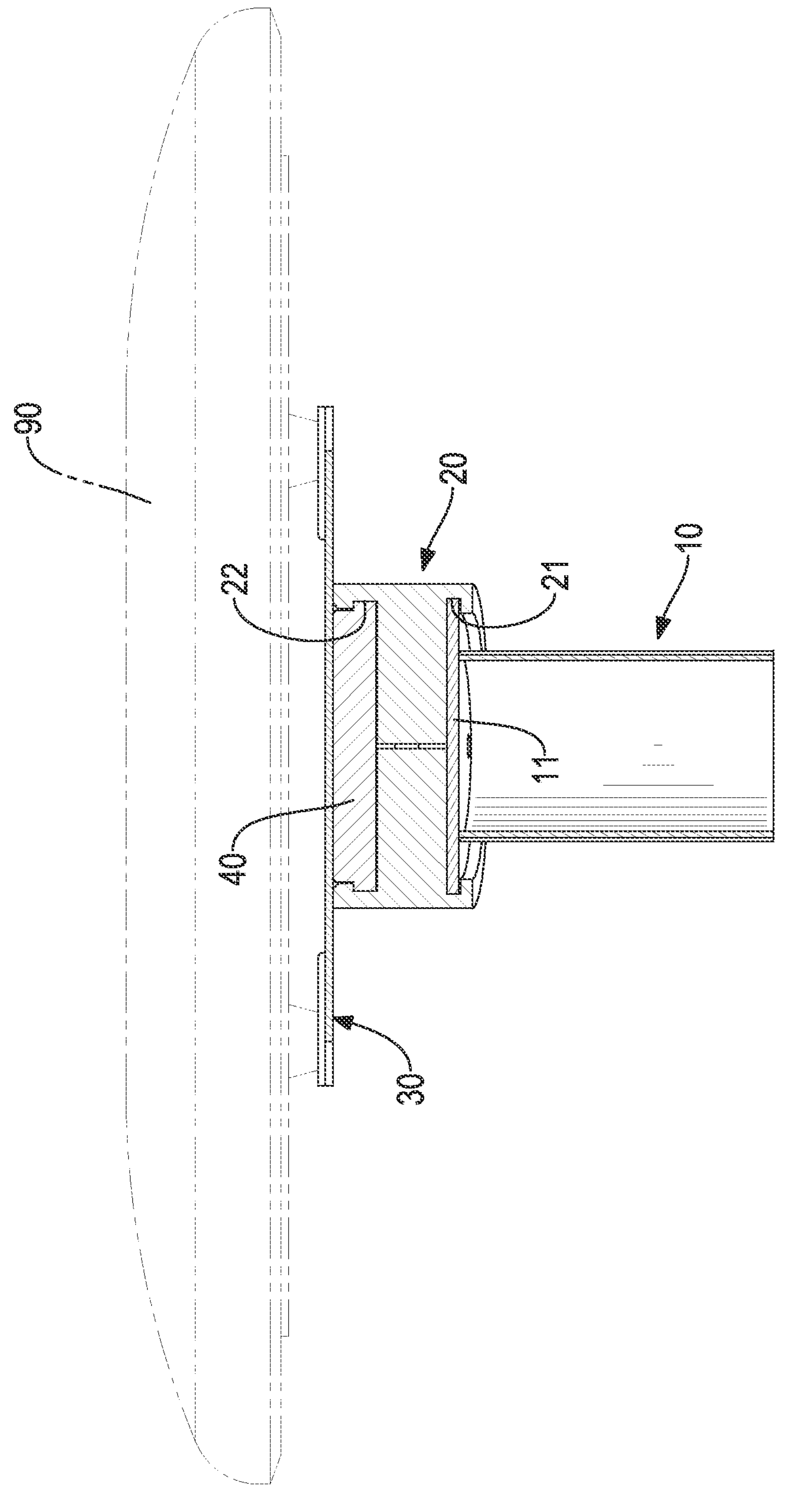
FIG. 4 is a sectional view across line 4-4 in FIG. 3.
Figure 5:
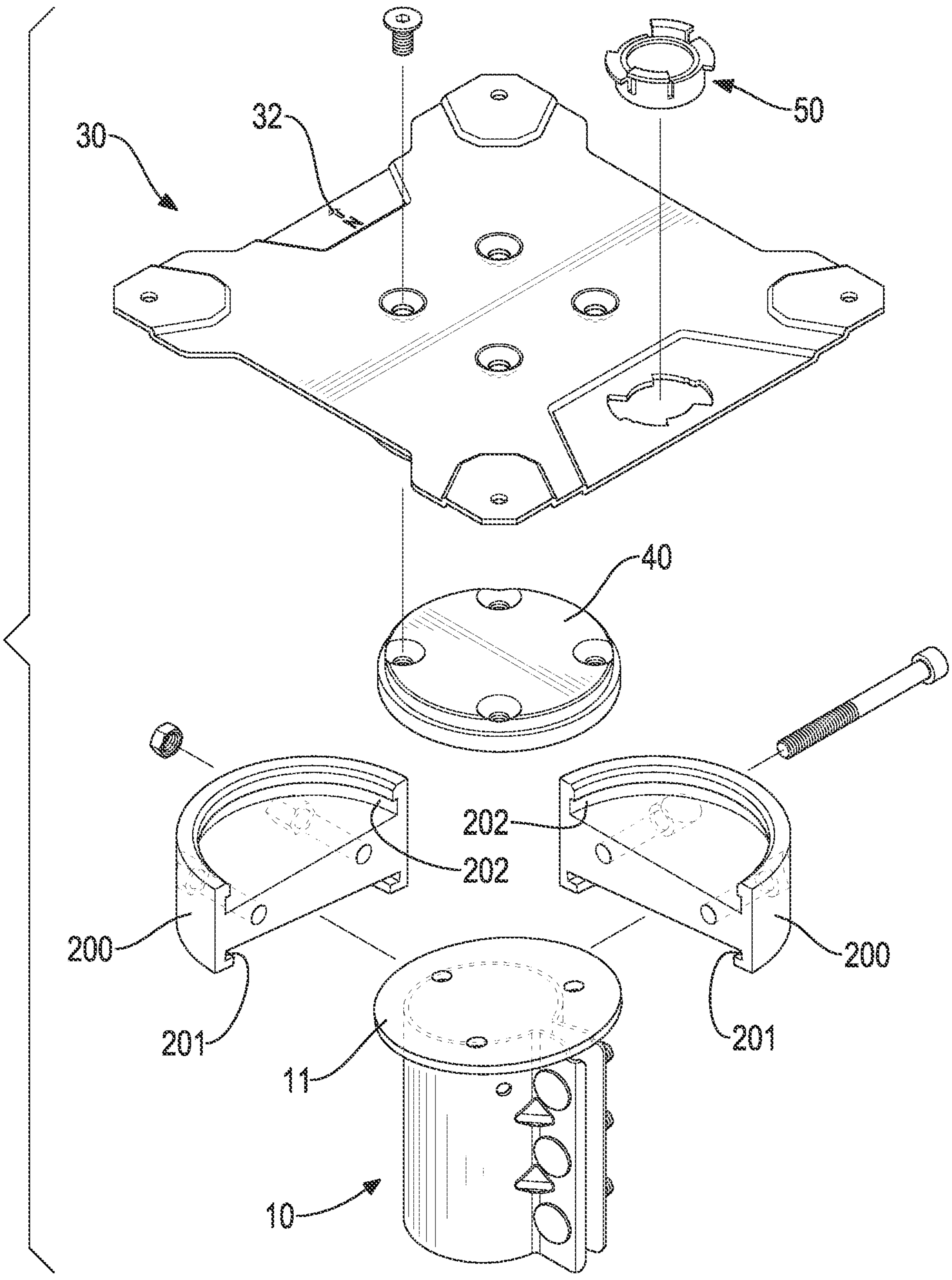
FIG. 5 is an exploded view of the fine-tuning holder in FIG. 1.

With reference to FIGS. 1 to 3, a fine-tuning holder for a low-earth-orbit-satellite array antenna of a preferred embodiment in accordance with the present invention is for mounting a low-earth-orbit-satellite array antenna 90 (LEOs array antenna) and has a supporting mount 10, an adjusting unit 20, and a tray 30. The supporting mount 10 is for disposing the fine-tuning holder; specifically, a supporting stand is disposed on a mounting position for setting the low-earth-orbit-satellite array antenna 90, and the fine-tuning holder can be fixed on the supporting stand by the supporting mount 10. In the preferred embodiment, the supporting mount 10 has a tube-shaped configuration for being sheathed onto a rod of the supporting stand to be fixed thereon. With reference to FIGS. 4 and 5, the supporting mount 10 has a mounting board 11 located on a top of the supporting mount 10.

With reference to FIGS. 2 to 4, the adjusting unit 20 is disposed on the supporting mount 10 and is configured to be rotated relative to the supporting mount 10. With reference to FIG. 4, in the preferred embodiment, the adjusting unit 20 has a bottom groove 21 located on a bottom of the adjusting unit 20 and facing downward. The mounting board 11 is contained in the bottom groove 21 to allow the adjusting unit 20 to be rotated around the mounting board 11.

Figure 6:
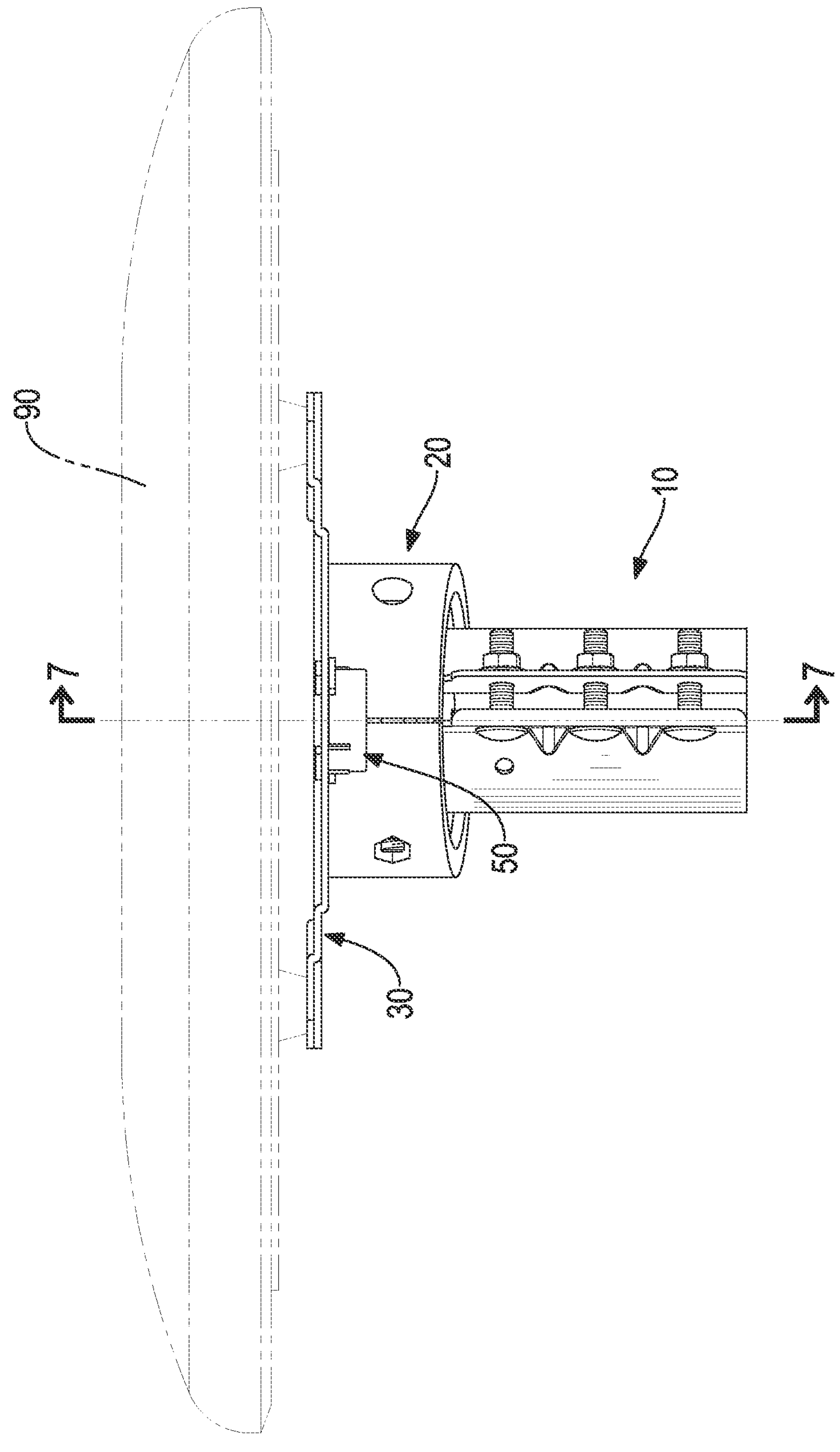
FIG. 6 is another side view of the fine-tuning holder in FIG. 1.

With reference to FIGS. 2 to 4, the tray 30 is disposed on the adjusting unit 20 and is configured to be rotated relative to the adjusting unit 20. With reference to FIG. 4, in the preferred embodiment, the adjusting unit 20 has a top groove 22 located on a top of the adjusting unit 20 and facing upward, and a bottom of the tray 30 is fixed with a rotating block 40 via bolts; the rotating block 40 is rotatably contained in the top groove 22 so that the tray 30 and the rotating block 40 are configured to be rotated relative to the adjusting unit 20. With reference to FIGS. 1, 3, and 6, a top surface of the tray 30 is for mounting the low-earth-orbit-satellite array antenna 90.

Figure 7:
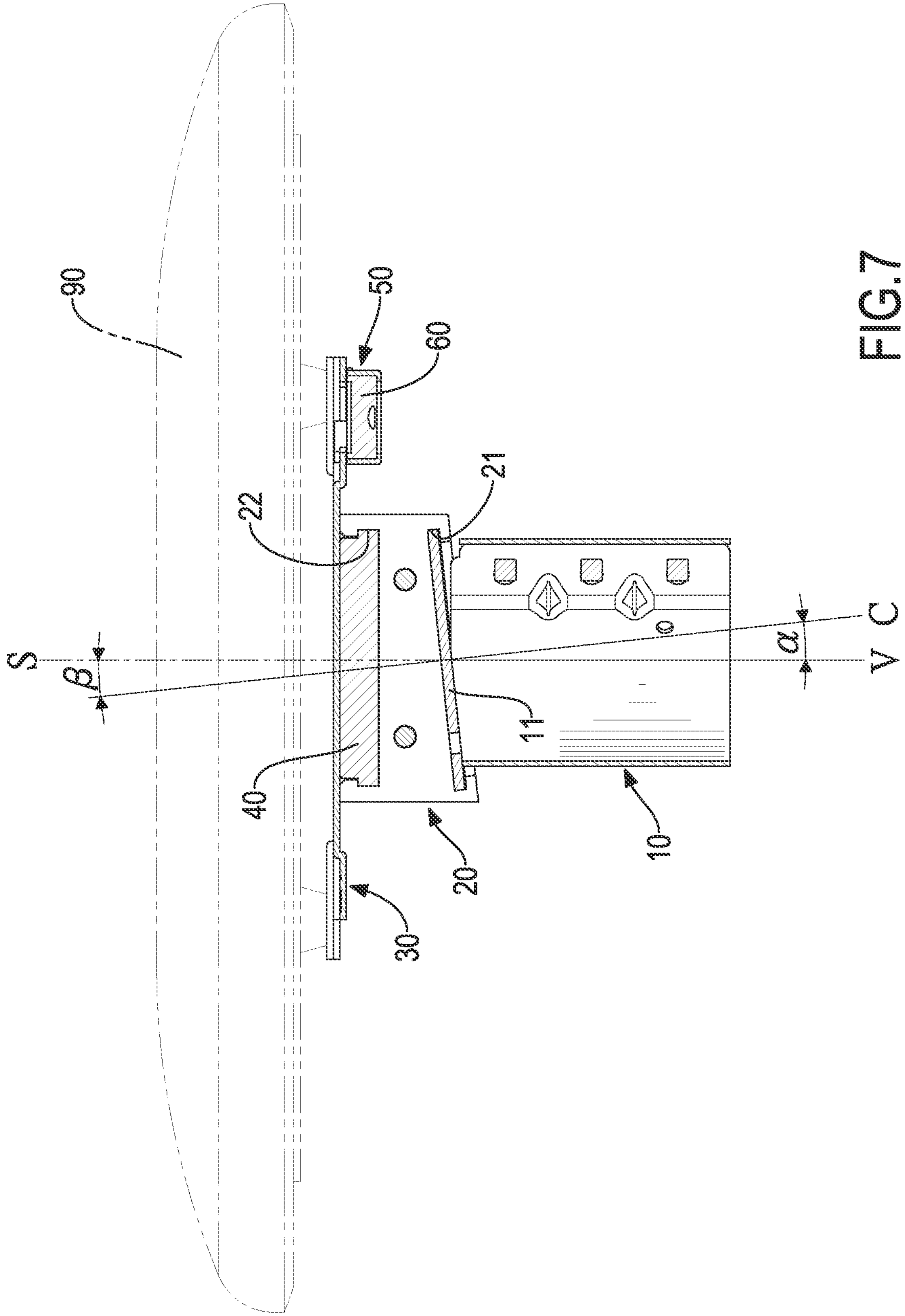
FIG. 7 is a sectional view across line 7-7 in FIG. 6.

With reference to FIG. 7, the supporting mount 10 has a fixed axis V; in the preferred embodiment, the fixed axis V is the central axis of the above-mentioned tube-shaped configuration of the supporting mount 10. The adjusting unit 20 is rotated around the mounting board 11 about a first rotating axis C, and the first rotating axis C is collinear with the central axes of the mounting board 11 and the bottom groove 21. The first rotating axis C is inclined relative to the fixed axis V of the supporting mount 10, and an angle α is defined between the first rotating axis C and the fixed axis V. The tray 30 and the rotating block 40 are rotated relative to the adjusting unit 20 about a second rotating axis S, and the second rotating axis S is collinear with the central axes of the top groove 22 and the rotating block 40 and is perpendicular to the tray 30. The second rotating axis S is inclined relative to the first rotating axis C, and an inclined angle β is defined between the second rotating axis S and the first rotating axis C.

With reference to FIG. 7, under an original condition, the second rotating axis S is collinear with the fixed axis V of the supporting mount 10. When the adjusting unit 20 is rotated relative to the supporting mount 10 about a first rotating axis C, since the second rotating axis S is inclined relative to the first rotating axis C, the second rotating axis S is deflected and is inclined relative to the fixed axis V. After the adjusting unit 20 is rotated 360° relative to the supporting mount 10, the second rotating axis S is collinear with the fixed axis V again. By the rotation of the adjusting unit 20 relative to the supporting mount 10, the second rotating axis S is deflected to adjust an altitude angle of the tray 30, and the tray 30 and the rotating block 40 are configured to be rotated relative to the adjusting unit 20 about the deflected second rotating axis S.

Figure 8:
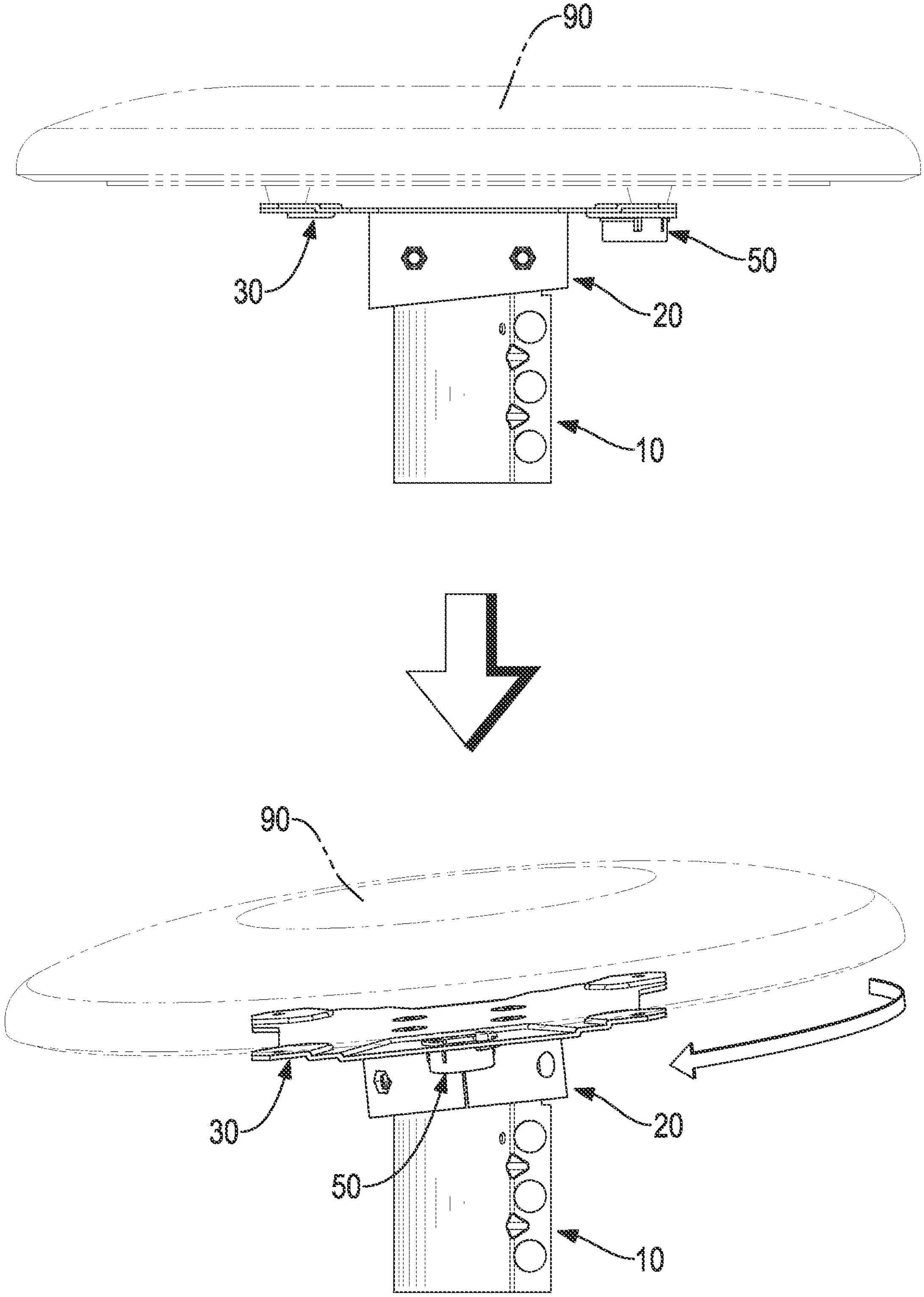
FIGS. 8 and 9 are operational views of the fine-tuning holder in FIG. 1.
Figure 9:
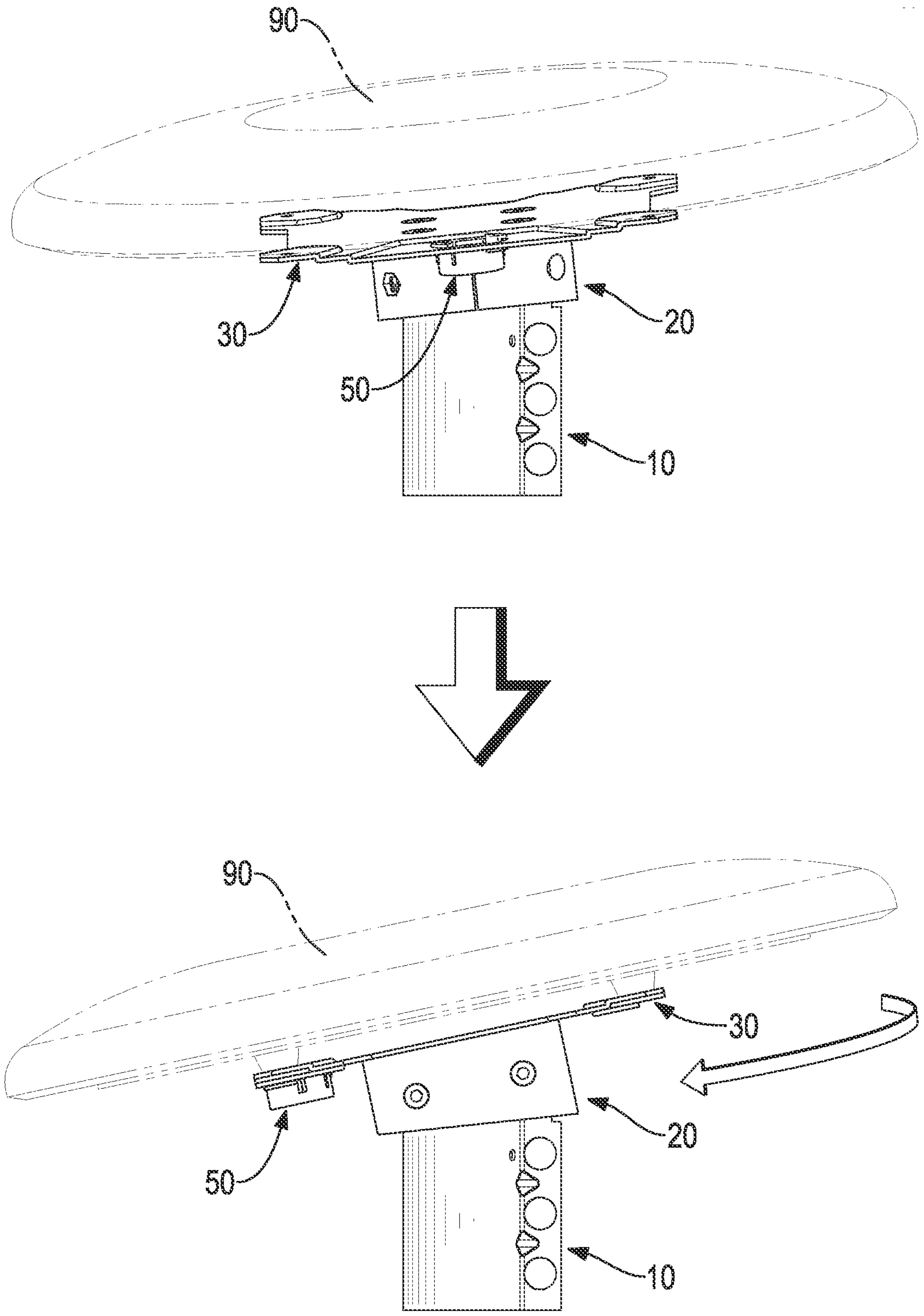

The adjustment of the altitude angle of the tray 30 is specifically shown in FIGS. 8 and 9. First, under the original condition, if the fixed axis V is defined in the vertical direction, the second rotating axis S being collinear with the fixed axis V is also in the vertical direction, and the tray 30 being perpendicular to the second rotating axis S is in a horizontal condition (with reference to the upper half of FIG. 8, the tray 30 is shown as a horizontal line in the side view). When the adjusting unit 20 is rotated 90° relative to the supporting mount 10 from the original condition, the tray 30 turns to an oblique condition from the horizontal condition (with reference to the lower half of FIG. 8 and the upper half of FIG. 9, the top surface of the tray 30 is shown in the side view).

Figure 10:
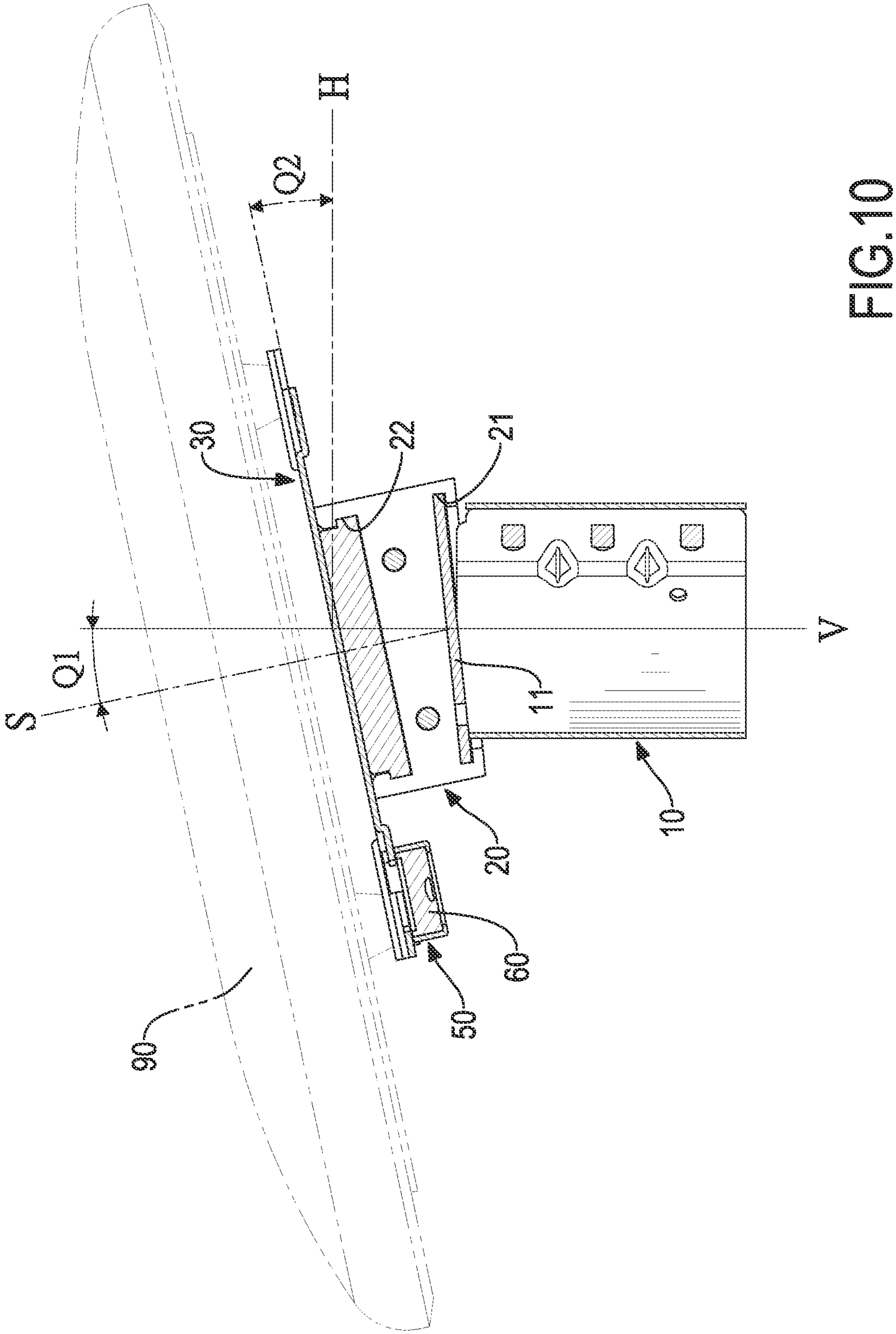
FIG. 10 is a sectional view of the fine-tuning holder in FIG. 1 after operation.

Then, the adjusting unit 20 continues to be rotated and is rotated 180° 6 relative to the supporting mount 10 from the original condition, and the tray 30 turns to an inclined condition (with reference to the lower half of FIG. 9, the tray 30 is shown as an inclined line in the side view). With reference to FIG. 10, at the time, the second rotating axis S is inclined relative to the fixed axis V, and a first angle Q1 is defined between the second rotating axis S and the fixed axis V; a second angle Q2 is defined between the tray 30 and a reference horizontal surface H being perpendicular to the fixed axis V and is equal to the first angle Q1. That is, the altitude angle of the tray 30 is adjusted with the magnitude of the second angle Q2 from the original condition.

Afterwards, the adjusting unit 20 continues to be rotated relative to the supporting mount 10, and the tray 30 returns to the oblique condition from the inclined condition. After the adjusting unit 20 is rotated 360° relative to the supporting mount 10, the second rotating axis S is collinear with the fixed axis V again, and the tray 30 returns to the horizontal condition.

When mounting the low-earth-orbit-satellite array antenna 90 by the fine-tuning holder of the present invention, if terrains of the mounting position have a flat surface (horizontal), the fixed axis V of the supporting mount 10 is directly aligned with the vertical direction after the fine-tuning holder is fixed on the supporting stand by the supporting mount 10. Since the second rotating axis S is collinear with the fixed axis V and perpendicular to the tray 30 under the original condition, the tray 30 is directly aligned with the horizon. Thereby, the azimuth angle of the tray 30 can be adjusted without disturbing the aligning with the horizon by rotating the tray 30 relative to the adjusting unit 20 about the second rotating axis S. Finally, the low-earth-orbit-satellite array antenna 90 is mounted onto the top surface of the tray 30 and is directly aligned with the horizon and the right azimuth angle.

Figure 11:
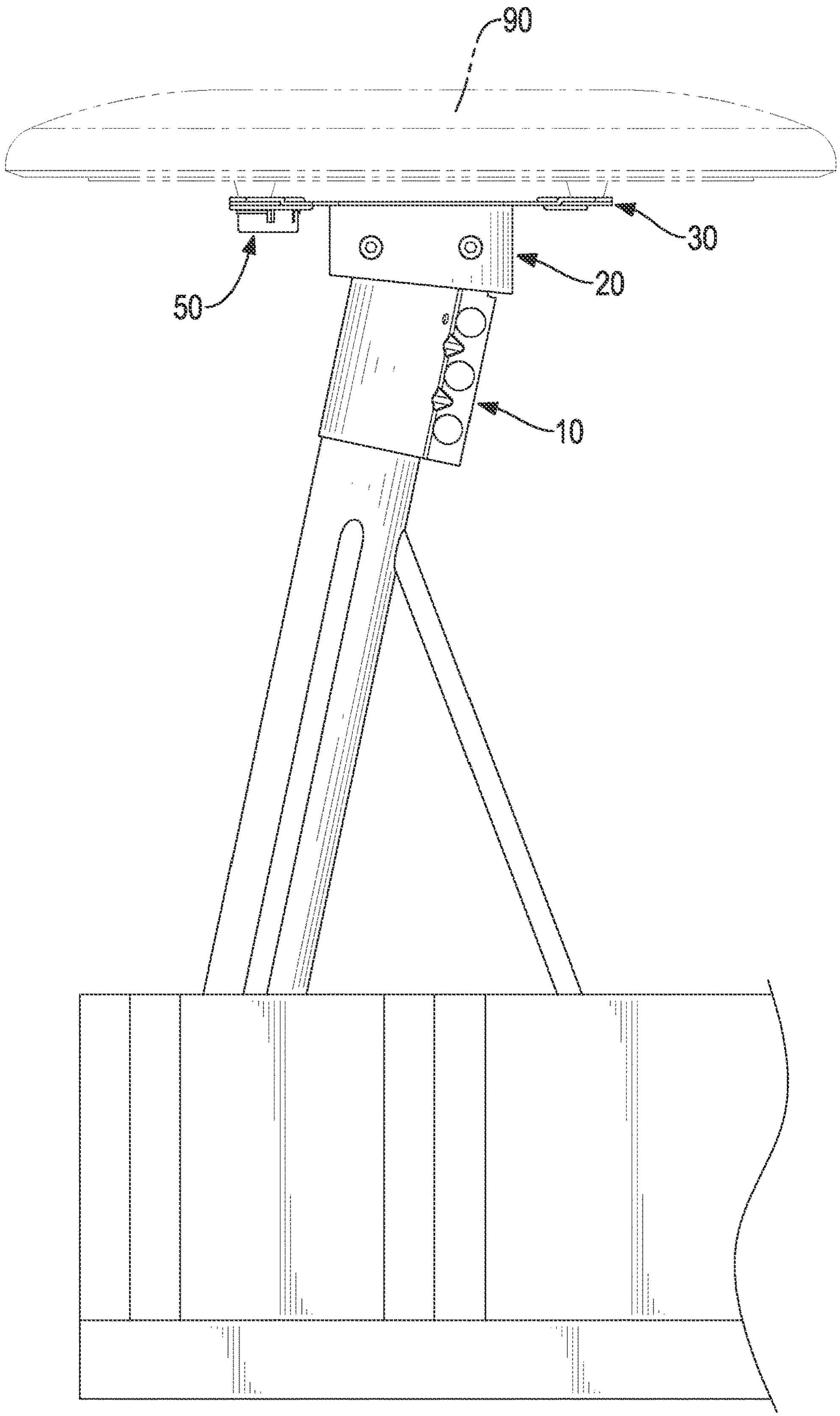
FIG. 11 is a side view of the fine-tuning holder in FIG. 1 fixed on a supporting stand.

If terrains of the mounting position have a rugged but not flat surface, the fixed axis V of the supporting mount 10 is not aligned with the vertical direction after the fine-tuning holder is fixed on the supporting stand by the supporting mount 10. The low-earth-orbit-satellite array antenna 90 cannot be aligned with the horizon if being directly mounted onto the tray 30 under the original condition. At the time, an operator rotates the adjusting unit 20 relative to the supporting mount 10 to deflect the second rotating axis S to be inclined relative to the fixed axis V so that the altitude angle of the tray 30 can be adjusted. After the tray 30 is adjusted to be aligned with the horizon, the operator rotates the tray 30 relative to the adjusting unit 20 about the second rotating axis S to adjust the azimuth angle of the tray 30. As shown in FIG. 11, the fine-tuning holder is fixed on the supporting stand being inclined due to terrains of the mounting position by the supporting mount 10, and the tray 30 can be aligned with the horizon and the right azimuth angle after adjustment. Afterwards, the low-earth-orbit-satellite array antenna 90 is mounted onto the tray 30 and is directly aligned with the horizon and the right azimuth angle.

When mounting the low-earth-orbit-satellite array antenna 90, if the low-earth-orbit-satellite array antenna 90 cannot be aligned with the horizon due to surroundings or terrains of the mounting position, the present invention allows the operator to rotate the adjusting unit 20 relative to the supporting mount 10 about the first rotating axis C for fine-tuning the altitude angle of the tray 30 and aligning the tray 30 with the horizon and then rotate the tray 30 relative to the adjusting unit 20 about the second rotating axis S for fine-tuning the azimuth angle without disturbing the aligning with the horizon. Thereby, the low-earth-orbit-satellite array antenna 90 can be directly aligned with the horizon and the right azimuth angle after mounting onto the tray 30. The present invention thus provides the fine-tuning holder that can align the low-earth-orbit-satellite array antenna 90 at different mounting positions and allow the low-earth-orbit-satellite array antenna 90 to have maximum efficiency.

In the preferred embodiment, the adjusting unit 20 has the bottom groove 21 and the top groove 22 to match the mounting board 11 of the supporting mount 10 and the rotating block 40 connected to the tray 30. In other embodiments, the adjusting unit 20 may have the mounting board 11 with the bottom groove 21 on the supporting mount 10, and the rotating block 40 may be connected to the adjusting unit 20 with the top groove 22 on the tray 30. As long as the adjusting unit 20 is configured to be rotated relative to the supporting mount 10 about the first rotating axis C being inclined relative to the fixed axis V of the supporting mount 10, the present invention allows the altitude angle of the tray 30 to be fine-tuned to align the tray 30 with the horizon; as long as the tray 30 is configured to be rotated relative to the adjusting unit 20 about the second rotating axis S being inclined relative to the first rotating axis C, the present invention allows the azimuth angle of the tray 30 to be adjusted without disturbing the aligning with the horizon.

Configurations between the adjusting unit 20, the tray 30, and the supporting mount 10 are not limited to the present invention.

To allow the mounting board 11 and the rotating block 40 to be respectively contained in the bottom groove 21 and the top groove 22, a groove opening of the bottom groove 21 has a diameter smaller than that of the mounting board 11, and a groove opening of the top groove 22 has a diameter smaller than that of the rotating block 40. With reference to FIG. 4, specifically, both the bottom groove 21 and the top groove 22 have an annular protruding edge disposed on said groove opening to respectively limit the mounting board 11 and the rotating block 40.

With reference to FIG. 5, in the preferred embodiment, the adjusting unit 20 has two connecting blocks 200, and each one of the two connecting blocks 200 has a bottom recess 201 and a top recess 202. The two connecting blocks 200 are detachably connected to and fixed with each other so that said bottom recesses 201 of the two connecting blocks 200 form the bottom groove 21, and said top recesses 202 of the two connecting blocks 200 form the top groove 22. By adopting the two connecting blocks 200, the adjusting unit 20 allows the mounting board 11 and the rotating block 40 to be respectively placed in the bottom groove 21 and the top groove 22 easier. First, the mounting board 11 and the rotating block 40 are respectively placed in the bottom recess 201 and the top recess 202 of one of the two connecting blocks 200, and then the two connecting blocks 200 are connected to and fixed with each other so that the mounting board 11 and the rotating block 40 can be respectively contained in the bottom groove 21 and the top groove 22 with the above-mentioned annular protruding edge.

As mentioned above, the adjusting unit 20 in the preferred embodiment has the two connecting blocks 200 to allow the mounting board 11 and the rotating block 40 to be respectively contained in the bottom groove 21 and the top groove 22 having said groove opening with a smaller diameter. In other embodiments, the adjusting unit 20 may also have an open-and-close mechanism disposed on said groove opening of each one of the bottom groove 21 and the top groove 22. First, said open-and-close mechanisms open for the mounting board 11 and the rotating block 40 to be respectively placed in the bottom groove 21 and the top groove 22, and then said open-and-close mechanisms close to allow said groove openings of the bottom groove 21 and the top groove 22 to shrink for respectively limiting the mounting board 11 and the rotating block 40 in the bottom groove 21 and the top groove 22. Thereby, configurations of the bottom groove 21 and the top groove 22 are not limited to the preferred embodiment.

Additionally, after the tray 30 is aligned with the horizon and the right azimuth angle, the tray 30, the adjusting unit 20, and the supporting mount 10 need to be fixed with each other to keep the tray 30 at the aligning position. In the preferred embodiment, the adjusting unit 20 has bolts mounted through the two connecting blocks 200 and then respectively screwed with nuts. After aligning the tray 30, the bolts are turned to tighten the two connecting blocks 200 so that the two connecting blocks 200 tightly clamp the mounting board 11 and the rotating block 40 to stop the adjusting unit 20 from being rotated relative to the supporting mount 10 and stop the tray 30 and the rotating block 40 from being rotated relative to the adjusting unit 20.

With reference to FIGS. 1, 2, and 5, in the preferred embodiment, the fine-tuning holder further has a containing groove 50 and a spirit level 60. The containing groove 50 is connected to the tray 30, and the spirit level 60 is contained in the containing groove 50. The containing groove 50 has an opening located on a bottom of the containing groove 50 and having a diameter smaller than that of the spirit level 60, and a groove opening of the containing groove 50 is formed on the position connecting the containing groove 50 and the tray 30 to allow the spirit level 60 to be placed in the containing groove 50. Thereby, the operator can watch the spirit level 60 from a bottom side or a top side of the containing groove 50 to ensure if the tray 30 is aligned with the horizon or not.

With reference to FIGS. 1 and 5, in the preferred embodiment, the tray 30 has a direction indicator 32 disposed on the top surface of the tray 30 and directed toward a side of the tray 30. In the preferred embodiment, the direction indicator 32 has an N-shaped mark (indicating the north) and an arrow-shaped mark as notifications when adjusting the azimuth angle of the tray 30. When the direction indicator 32 is directed toward the north, the tray 30 is aligned with the right azimuth angle so that the low-earth-orbit-satellite array antenna 90 is directly aligned with the right azimuth angle when mounted on the tray 30.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A fine-tuning holder for a low-earth-orbit-satellite array antenna, the fine-tuning holder comprising:

a supporting mount having a fixed axis;

an adjusting unit disposed on the supporting mount and configured to be rotated relative to the supporting mount about a first rotating axis; and a tray disposed on the adjusting unit and configured to be rotated relative to the adjusting unit about a second rotating axis;

wherein the first rotating axis is inclined relative to the fixed axis, and the second rotating axis is inclined relative to the first rotating axis;

the adjusting unit has a bottom groove;

the supporting mount has a mounting board contained in the bottom groove to allow the adjusting unit to be rotated around the mounting board;

the first rotating axis is a central axis of the mounting board; and the second rotating axis is a central axis of the adjusting unit.

2. The fine-tuning holder as claimed in claim 1, wherein the adjusting unit has two connecting blocks detachably connected to each other; and the two connecting blocks are configured to tightly clamp the mounting board to stop the adjusting unit from being rotated relative to the mounting board.

3. The fine-tuning holder as claimed in claim 2, wherein each one of the two connecting blocks has a bottom recess;

when the two connecting blocks are connected to each other, said bottom recesses of the two connecting blocks form the bottom groove; and a groove opening of the bottom groove has a diameter being smaller than a diameter of the mounting board to limit the mounting board inside the bottom groove.

4. The fine-tuning holder as claimed in claim 1, wherein the adjusting unit has a top groove; and the fine-tuning holder has a rotating block connected to the tray and rotatably contained in the top groove to allow the rotating block and the tray to be rotated relative to the adjusting unit.

5. The fine-tuning holder as claimed in claim 4, wherein the adjusting unit has two connecting blocks detachably connected to each other; and the two connecting blocks are configured to tightly clamp the rotating block to stop the tray and the rotating block from being rotated relative to the adjusting unit.

6. The fine-tuning holder as claimed in claim 5, wherein each one of the two connecting blocks has a top recess;

when the two connecting blocks are connected to each other, said top recesses of the two connecting blocks form the top groove; and a groove opening of the top groove has a diameter being smaller than a diameter of the rotating block to limit the rotating block inside the top groove.

7. The fine-tuning holder as claimed in claim 1, wherein the fine-tuning holder has a containing groove connected to the tray and a spirit level contained in the containing groove.

8. The fine-tuning holder as claimed in claim 1, wherein the tray has a direction indicator directed toward a side of the tray.

* * * * *